Patented Mar. 10, 1942

2,276,097

UNITED STATES PATENT OFFICE 2,276,097

ALIPHATIC SULPHONYL FLUORIDES AND THEIR PREPARATION

Paul L. Salzberg, Wilmington, Del., assignor to E. I. du Pont de Nemours & Company, Wilmington, Del., a corporation of Delaware No Drawing. Application July 25, 1939, Serial No. 286,475

8 Claims. (Cl. 260—543)

This invention relates to the preparation of sulphonyl fluorides. More particularly it relates to the preparation of sulphonyl fluorides from alkane and chloroalkane sulphonyl chlorides. Still more particularly it relates to the preparation of sulphonyl fluorides from the mixtures containing sulphonyl chlorides which are obtained by reacting a non-gaseous aliphatic hydrocarbon especially a saturated aliphatic non-gaseous hydrocarbon with a gaseous mixture containing sulphur dioxide and chlorine.

This invention has for an object the preparation of higher aliphatic sulphonyl fluorides from alkane and chloroalkanesulphonyl chlorides. A further object is the preparation of alkane and chloroalkanesulphonyl fluorides containing 8 or more carbon atoms. Still other objects will be apparent from the hereinafter described invention.

The sulphonyl chlorides used as reactants in the processes of the present invention may be obtained in various manners. They may be prepared, for example, by reacting the alkali metal salts of hydrocarbon sulphonic acids with phosphorous pentachloride. Thus, the primary, secondary and branched chain alkane sulphonic acid alkali metal salts of at least 8 carbon atoms are useful starting materials.

The sulphonyl chlorides may also be obtained by reacting an alkyl halide, especially an alkyl chloride, sulphate, etc., with thiourea and subsequently with chlorine. The alkyl halides of at least 8 carbon atoms such as octyl, decyl, dodecyl, tetradecyl, and octadecyl chloride are suitable reactants for the last-mentioned process. However, the invention is not limited to the normal alkyl halides just mentioned, but on the contrary, secondary and branched chain alkyl halides may be used for reaction with thiourea and subsequent reaction with chlorine. Furthermore, more than one chlorine atom may be in the molecule. The mono- and polychlorinated petroleum oils and waxes containing not less than 12 carbon atoms obtained by treating kerosene, naphtha, paraffin oil, paraffin wax and lubricating oils or an essentially paraffinic or naphthenic character with chlorine, are useful for the preparation of sulphonyl chlorides by the last-described method. This may be done by passing dry chlorine into the petroleum oil, for example, at about 100° C., preferably in the presence of chlorination catalysts. The reaction products are then reacted with thiourea in a high boiling solvent such as butanol until a sample is completely soluble in water. The pseudo-thiourea hydrochlorides are dissolved or suspended in water and chlorine passed through at about 10 to 25° C. Sulphonyl chlorides of the petroleum oil separate out as an oily or waxy layer.

The sulphonyl chloride compositions used as starting materials in a preferred embodiment of the invention are prepared by reacting a non-gaseous aliphatic hydrocarbon or mixture of such hydrocarbons containing at least 8 carbon atoms with gaseous chlorine and gaseous sulphur dioxide preferably in the presence of actinic light after the manner described in Reed U. S. Patent 2,046,090. The reaction products are rather complex mixtures containing saturated primary and secondary alkane monosulphonyl chlorides, chloroalkane sulphonyl chlorides, alkane polysulphonyl chlorides, chloroalkane polysulphonyl chlorides, chlorohydrocarbons, etc. These mixtures, especially after removal of residual sulphur dioxide, chlorine, and hydrogen chloride by suitable treatment, such as bubbling air or nitrogen through the product or by vacuum treatment, are suitable as starting materials for the present invention.

In the case where a mixture of hydrocarbons is used, the reaction products are even more complex which renders the resulting sulphonyl fluorides quite complex. This is particularly true when the mixture of hydrocarbons used is a petroleum fraction. The petroleum oils may contain slight or even substantial amounts of naphthenic or cycloaliphatic constituents which react in the same way to produce the same type of cycloaliphatic substituents.

In a further embodiment of the invention the petroleum oils or fractions including substantially pure compounds, may be wholly cycloaliphatic or naphthenic in nature. Thus, the final products are naphthene sulphonyl fluorides which may also contain chlornaphthene sulphonyl fluorides, etc.

The above and other objects are accomplished by the following invention which comprises reacting alkane and/or chloroalkanesulphonyl chlorides and/or mixtures of the same containing 8 or more carbon atoms, for instance, with a water-soluble metal fluoride to obtain hydrocarbon sulphonyl fluorides, e. g., alkane and chloroalkane mono- and poly-sulphonyl fluorides.

In a more limited sense they are accomplished by reacting the above-described sulphonyl chloride mixtures having at least eight carbon atoms with an alkali metal fluoride in an aqueous medium.

In a preferred embodiment of the invention they are accomplished by reacting the above-described purified sulphonyl chloride mixtures which contain combined chlorine in the hydrocarbon radicals having at least eight carbon atoms with aqueous potassium fluoride.

Approximately two mols of potassium fluoride is used for each mol of sulphonyl chloride. The potassium fluoride is dissolved in slightly more than its weight of water, and is placed in a reaction vessel of suitable size fitted with a leak-proof stirrer and a reflux condenser. The hydrocarbon sulphonyl chloride is added and the reaction mixture is heated to reflux with stirring until the reaction is completed to the desired extent. In practice this may be a period of about 15 minutes to two hours. On cooling the sulphonyl fluoride separates as an upper layer in some cases and can be separated and dried. In other cases when the product remains emulsified the reaction mixture is extracted with ether, benzene, or other suitable solvent. The ether extract is dried over a suitable dehydrating agent such as sodium sulphate, and the product is obtained on evaporating the solvent.

The invention will be more fully illustrated but is not intended to be limited by the following examples in which the parts stated are by weight:

Example I

A mixture predominating in chlorodecanesulphonyl chlorides and containing also some decanesulphonyl chlorides is prepared as follows: Two hundred thirteen parts of n-decane are reacted with sulphur dioxide and chlorine in the ratio of 3 parts of sulphur dioxide to 1 part of chlorine, according to the process of U. S. Patent 2,046,090 for a period of 1½ hours. Dry air is bubbled through the product to remove residual gases.

Thirty-four parts of potassium fluoride ($KF.2H_2O$) are dissolved in 50 parts of water and placed in a reaction vessel fitted with a leak-proof stirrer and a reflux condenser. Fifty parts of the chlorodecanesulphonyl chloride mixture, the preparation of which is described above, are added and the reaction mixture is heated to reflux with stirring for one-half hour. A light-brown upper layer separates when the reaction mixture stands over night. The upper layer containing the product is separated from the reaction mixture, washed with water, and dried in a vacuum over phosphorous pentoxide. About 30 parts of a mobile, light-brown liquid with a pleasant odor are thus obtained. The product contains 5.2% fluorine.

Example II

Fifty-two and one-half parts of potassium fluoride ($KF.2H_2O$) are dissolved in 75 parts of water and put in a reaction vessel provided with a leak-proof stirrer and a reflux condenser. One hundred parts of a chlorocetanesulphonyl chloride mixture prepared by the chlorine-sulphur dioxide treatment of cetane, as described in Example I, are added and the reaction mixture is heated to reflux with stirring for one hour. The reaction mixture is diluted with water and extracted with ether. The ether extract is washed with water, the ether is evaporated, and the product thus obtained is dried in vacuum over phosphorous pentoxide. The product is amber-colored and slightly cloudy. Fifty-eight parts of a product analyzing as follows are obtained: sulphur, 4.6%; chlorine, 21.4%; fluorine, 2.21%.

Example III

The starting material used in this example is a water-white mineral oil fraction having the following analytical characteristics:

A. S. T. M. distillation range:

| | | |
|---|---|---|
| First drop | °C | 262–265 |
| 10 cc | °C | 270–272 |
| 50 cc | °C | 276–278 |
| 90 cc | °C | 287–290 |
| 95 cc | °C | 291–292 |
| Dry | °C | 306–314 |
| Saybolt Universal viscosity at 100° F | sec | 36–37 |
| Specific gravity 15.5°/15.5° C | | 0.8030–0.8035 |
| Refractive index 20° C | | 1.4437–1.4442 |

This oil, which is a No. 40 white oil, is reacted with chlorine and sulphur dioxide to get white oil-sulphonyl chloride mixture according to the process described in Example I. Seventy-five parts of potassium fluoride ($KF.2H_2O$), dissolved in 100 parts of water, and 155 parts of the white oil-sulphonyl chlorides are put in a reaction vessel equipped with a reflux condenser and a leak-proof stirrer, and the reaction mixture is heated to reflux with stirring for about an hour. The reaction mixture is then diluted with water, cooled, and extracted with ether. The ether extract is washed with water, dilute caustic, and again with water, and dried over sodium sulphate. On evaporation of the ether, 88 parts of dark, red-brown oil with a faint, ester-like odor are obtained.

Example IV

Three hundred parts of paraffin wax are reacted with 512 parts of sulphur dioxide and 209 parts of chlorine to get chloro-paraffin wax-sulphonyl chlorides by the method previously described. When the reaction is completed, dry nitrogen is bubbled through the reaction mixture to remove residual gases.

Thirty parts of potassium fluoride ($KF.2H_2O$) are dissolved in 100 parts of water. Fifty parts of the above chloro-paraffin wax-sulphonyl chlorides are added and the reaction mixture is heated under reflux for two hours. The product is extracted with benzene, evaporated to dryness in a vacuum, taken up again in benzene, dried over sodium sulphate, and evaporated to dryness again. Thirty-seven parts of a soft, mushy, pale-yellow product are obtained.

In place of the specific alkane sulphonyl chlorides and chloroalkane sulphonyl chloride reactant materials described in the above examples, there may be substituted other such products and mixtures which contain at least eight carbon atoms. Thus, the alkane sulphonyl chlorides and chloroalkane sulphonyl chlorides may be obtained by the chlorine-sulphur dioxide treatment of any normal or branched-chain saturated aliphatic hydrocarbon containing at least eight carbon atoms. Mixtures of such hydrocarbons may be used, including naturally occurring mixtures such as petroleum oils and waxes. The mixtures are preferably substantially free from unsaturated constituents including aromatics but may contain cycloaliphatic or naphthene hydrocarbons as above stated. As examples of suitable specific hydrocarbons and mixtures mention is made of normal alkanes, e. g. n-octane, n-nonane, n-dodecane, n-tetradecane, n-pentadecane, n-octadecane, iso-alkanes, e. g. iso-octane, iso-hexadecane (from hydrogenation of tetra iso-butylene), iso-decane (from hydrogenation of di-isoamylene), and the like. By similar means iso-pentadecane (made by hydrogenating triisoamylene), iso-dodecane (made by hydrogenating tri-isobutylene), iso-octane (made by hydrogenating di-isobutylene), and mixtures of iso-alkanes obtained by refining the lower-boiling petroleum distillates may be used to give sulphonyl chlorides for conversion to sulphonyl fluorides.

Hydrogenated polymerized bodies obtained from hexene-3 such as iso-dodecane (made by hydrogenating di-hexene), iso-octadecane (made by hydrogenating tri-hexene), and other synthetic branched chain paraffins made by hydrogenating polymerized olefines or acetylenes may be used to give sulphonyl chlorides for conversion to sulphonyl fluorides according to this invention.

Other branched chain hydrocarbons may be treated by the method of the above-mentioned patent to produce sulphonyl chloride starting materials for the process of this invention. The hydrocarbons may be obtained by known methods, such as dehydration followed by subsequent hydrogenation, direct hydrogenation, from compounds such as: 2-ethyl hexanol-1; 2:6-dimethyl heptene-2-ol-6; 2:6-dimethyl octene-2-ol-8; 4-methyl heptanol-1; 2-n-butyl octanol-1; 2-methyl tridecanol-2; 7-ethyl-2-methyl undecanol-4; 5-ethyl nonanol-2; 5,11-diethyl pentadecanol-8; 3-ethyl heptanol-6; 3,9-diethyl undecanol-6; 3-ethyl undecanol-6; 3-ethyl-8-methyl nonanol-6; 3,9-diethyltridecanol-6; 6-ethyl decanol-3; 2-methyl nonanol-4; 9-ethyl tridecanol-6; 5,7-diethyl undecanol-4; 9-ethyl-5-methyl tridecanol-8; 5-methyl-1-cyclo-hexanol-3; 4,9,12-trimethyl pentadecanol-7; 3,8,11-trimethyl tridecanol-6; 8-methyl tridecanol-6; 2,7,10-trimethyl undecanol-5; 2,4,9,12,14-pentamethyl pentadecanol-7; 5,13-diethyl-10-methyl heptadecanol-8; 2,4,6,9,10,12,14-heptamethyl pentadecanol-7; 2-n-hexyl decanol-1, and the like.

Scale wax, Asiatic wax, match wax, wax-distillates, white oils, water-white kerosene, etc. have utility in the preparation of the intermediate sulphonyl chlorides and result in the preparation of new sulphonyl fluoride containing compositions which have great utility in the arts.

In place of potassium fluoride which is the preferred reactant may be substituted other fluorinating agents capable of replacing chlorine atoms by fluorine. The appreciably water-soluble metal fluorides have utility in the process. Suitable additional fluorides include sodium, silver and antimony fluorides. The metal fluorides are preferably used in aqueous solutions which may vary widely in concentration. Good results are obtained with about 25% up to saturated solutions. In some cases, particularly where antimony fluorides are used as fluorinating agents, hydrogen fluoride may be passed in to replenish the catalyst. In general, the more concentrated solutions are preferred. In some cases, fused metal fluorides may be used to advantage.

The temperature at which the reaction is carried out may vary over a wide range. A practical range is from 50° C. up to the reflux temperature of the reaction mixture. For the lower temperatures longer times of heating are necessary. At the reflux temperature the time required for the reaction may vary from a few minutes to several hours. In some cases it may be desirable to use pressures greater than atmospheric pressure so that reaction temperatures higher than ordinary reflux temperatures can be obtained.

Any of the usual corrosion resistant materials used for the manufacture of corrosive acidic chemicals may be used for carrying out the process. Glass equipment is suitable for the reaction although it is usually etched to some extent. Any other suitable apparatus may be used, such as various types of reaction kettles. The materials of construction may be any suitably resistant material, such as copper, glass, enameled vessels, metal alloys, etc.

The sulphonyl fluoride containing reaction products may be worked up in various ways to concentrate or purify the same. For instance, the sulphonyl fluoride may be removed from the reaction mixture simply by separation as a separate phase. Dilution with water or an organic solvent favors the separation in some cases. Extraction with immiscible organic solvents is generally the most satisfactory method. Suitable solvents include ether, benzene, toluene, carbon tetrachloride, chloroform, and the like. Separation may be also accomplished by steam distillation. After separation from the reaction mixture the product may be further purified by drying over various drying agents acording to the usual methods, by treatment with decolorizing charcoal or similar agents, and in some cases by distillation in vacuum.

The higher alkane- and chloroalkane sulphonyl fluorides and mixtures thereof prepared in accordance with this invention are useful as addition agents to mineral oils to improve their lubricating properties. In particular these products increase the film strength of lubricating oils and reduce wear. Aqueous emulsions of these products are also useful as lubricants for metal drawing and wire drawing, and also as cutting oils. The products are also useful as insecticides and may be incorporated in various types of insecticidal compositions.

This invention provides new and useful long-chain alkane- and chloroalkane sulphonyl fluorides. The combination of a long hydrocarbon chain with the sulphonyl fluoride group yields compounds with peculiar properties which make them useful as lubricating oil modifiers. The low volatility of these compounds and their resistance to hydrolysis also enhance their usefulness.

As many apparently widely different embodiments of this invention may be made without departing from the spirit and scope thereof, it is to be understood that I do not limit myself to the specific embodiments hereof except as defined by the specific claims.

I claim:

1. The process which comprises reacting an alkane hydrocarbon of at least 8 carbon atoms with admixed sulphur dioxide and chlorine, recovering the mixture of hydrocarbon and chlorohydrocarbon sulphonyl chlorides and reacting it with an aqueous solution of a water-soluble metal fluoride under conditions of reflux while agitating the reaction mixture and recovering a mixture of hydrocarbon sulphonyl fluorides containing chlorine attached to carbon.

2. A process as set forth in claim 1 wherein said hydrocarbon is a petroleum oil.

3. A process as set forth in claim 1 wherein said hydrocarbon is a paraffin wax.

4. A process as set forth in claim 1 wherein said hydrocarbon is a normal alkane.

5. In a process of producing hydrocarbon sulphonyl fluorides, the steps which comprise reacting an alkane sulphonyl chloride mixture consisting essentially of primary and secondary alkane mono- and polysulphonyl chlorides and chloroalkane sulphonyl chlorides wherein the alkyl radicals contain at least 8 carbon atoms with an aqueous solution of a water-soluble metal fluoride under conditions of reflux while agitating the reaction mixture and recovering a mixture consisting essentially of primary and secondary alkane mono- and poly-sulphonyl fluorides and chloroalkane sulphonyl fluorides corresponding to said sulphonyl chlorides.

6. A process as set forth in claim 1, wherein potassium fluoride is used.

7. A mixture of alkane sulphonyl fluorides containing at least 8 carbon atoms produced by the process of claim 1.

8. A mixture which comprises essentially petroleum oil sulphonyl fluorides which consists of primary and secondary chloro-alkane mono- and poly-sulphonyl fluorides and alkane mono- and poly-sulphonyl fluorides.

PAUL L. SALZBERG.